US008070203B2

(12) United States Patent
Schaumberger

(10) Patent No.: US 8,070,203 B2
(45) Date of Patent: Dec. 6, 2011

(54) METHOD FOR CONTROLLING VACUUM-OPERATED HOISTS AND LOAD PROTECTION DEVICE FOR VACUUM-OPERATED HOISTS

(76) Inventor: Franz Schaumberger, Aschach (AT)

( * ) Notice: Subject to any disclaimer, the term of this patent is extended or adjusted under 35 U.S.C. 154(b) by 700 days.

(21) Appl. No.: 12/066,264

(22) PCT Filed: Sep. 21, 2006

(86) PCT No.: PCT/EP2006/009173
§ 371 (c)(1),
(2), (4) Date: Jun. 20, 2008

(87) PCT Pub. No.: WO2007/051508
PCT Pub. Date: May 10, 2007

(65) Prior Publication Data

US 2008/0247856 A1 Oct. 9, 2008

(30) Foreign Application Priority Data

Sep. 24, 2005 (DE) ......................... 10 2005 045 681

(51) Int. Cl.
*B25J 15/06* (2006.01)

(52) U.S. Cl. ......... 294/183; 294/186; 294/907; 414/627

(58) Field of Classification Search ................. 294/64.1, 294/64.2, 64.3, 65, 907; 414/627, 737; 901/40
See application file for complete search history.

(56) References Cited

U.S. PATENT DOCUMENTS 3,933,388 A 1/1976 Conboy
4,557,659 A * 12/1985 Scaglia ......................... 414/627
4,925,225 A * 5/1990 Dost ............................ 294/64.1
5,284,416 A 2/1994 Schmidt et al.
5,752,729 A * 5/1998 Crozier et al. .................... 294/2
5,791,861 A * 8/1998 Seelig ........................... 414/627
6,817,639 B2 * 11/2004 Schmalz et al. ............. 294/64.1

FOREIGN PATENT DOCUMENTS

DE 101 39-203 5/2002
EP 0 108 725 1/1987
JP 541 22 558 9/2006

OTHER PUBLICATIONS

PCT Search Report for PCT/EP2006/009173 filed on Sep. 21, 2006 in the name of Eckelt Glass GmbH et al. (English translation).

PCT Written Opinion for PCT/EP2006/009173 filed on Sep. 21, 2006 in the name of Eckelt Glass GmbH et al. (English translation).

PCT International Preliminary Report on Patenability for PCT/EP2006/009173 filed on Sep. 21, 2006 in the name of Eckelt Glass GmbH et al. (English translation).

* cited by examiner

*Primary Examiner* — Dean Kramer
(74) *Attorney, Agent, or Firm* — Steinfl & Bruno LLP

(57) ABSTRACT

A method for operating vacuum-operated hoists with at least one elastically deformable vacuum-operated lifting mechanism, with a controllable vacuum generator, and with at least one motorized lifting drive is disclosed. A load detection device is used in order to detect the weight of a load picked up by the hoist. The load detection device generates a protection signal directly after detection of a load exceeding a predetermined tare weight of the hoist if the vacuum is insufficient to lift the load. The protection signal indirectly or directly deactivates the lifting drive with the aid of a switch-off control and/or prevents further lifting of the load if an insufficient vacuum or no vacuum is present when an increased load is detected and lifting begins.

12 Claims, 2 Drawing Sheets

METHOD FOR CONTROLLING VACUUM-OPERATED HOISTS AND LOAD PROTECTION DEVICE FOR VACUUM-OPERATED HOISTS

FIELD

The invention relates to a method for controlling vacuum-operated hoists and to load protection for vacuum-operated hoists.

BACKGROUND

A relevant protection device for vacuum-operated hoists is known from JP 06 270 086 A (Abstract). This comprises a pilot or servo valve that is controllable with the aid of a pressure differential and a weight detection unit when a load is lifted. This pilot valve prevents the vacuum from being able to be switched off inadvertently while a load is suspended.

Such vacuum-operated hoists have diverse use for the lifting of articles with large surface areas, e.g., metal sheets, glass plates, etc., but also of paper bags for bulk materials. They include in many embodiments a large number of diaphragm lifters or suction cups with lid seals that can be evacuated after placement on the article to be lifted.

Immediately after placement of said suction cups, they can already sit sealingly on the surface. During placement, air may be displaced from the space between the suction cup and the surface of the load. This generates a certain displacement vacuum. If the load is lifted already before evacuation or before the vacuum is turned on, it is possibly even still held in horizontal orientation. However, if the load is rotated to the vertical or even positioned at a slight angle, the load may be dropped if the displacement vacuum is no longer sufficient. This practical operational problem occurs primarily with loads whose weight is clearly the maximum liftable load limit. Weights near the nominal load of the hoist usually cannot even be lifted with the displacement vacuum alone. It is precisely this random occurrence of falling loads that makes the identification of the problem and the remedies more difficult.

EP 0 108 725 B1 describes another pneumatic lifting device with safety characteristics in which a mechanical load detection device (sensor) can control the application of a vacuum. However, with it is substantially guaranteed that the vacuum is not turned on before the application of the suction cups on a surface of a load.

DE 101 39 203 A1 discloses a device for handling loads with the aid of a suction cup lifting device. By means of a strain gauge measurement cell arrangement lying in the lift force flow, the weight of any suspended load is detected. The electrical signal resulting from the current weight is converted into a lifting or holding force sufficient for the static holding of the suspended load. Activation forces of a manual control lever are mechanically introduced into the measurements cell arrangement such that they positively or negatively overlay the weight dependent signal. A simulated raising of the suspended load (overlay of a positive signal) by raising the control lever in the lift direction results in further lifting of the load already picked up and held, whereas this can be lowered again by apparent reduction of the load using the control lever (overlay of a negative signal by pushing the lever down). The aforementioned document does not express itself with regard to monitoring the actual lifting process.

SUMMARY

The object of the invention is to provide a method for control of such hoists with elastically deformable vacuum-operated lifting mechanisms, with which their operation is safer, in particular upon the initial lifting of loads, as well as to provide improved load protection for such hoists.

This object is accomplished according to the invention with regard to the method with the features of claim 20. The features of claim 33 report a corresponding load protection device with which, in particular, the method according to the invention is executable; and claims 40 and 42 are directed at a hoist that is operated according to the method of the invention and/or is equipped with a device according to the invention. The characteristics of the claims depending on the respective independent claims provide advantageous improvements of this invention.

The invention relates primarily, but not exclusively, to handling hoists with manual control that are used by operators in industry and trades for the movement, turning, and transport of articles. Thus, it serves not only for load protection, but also, in particular, for personal safety and accident avoidance. However, it may, as needed, obviously be used with fully or partially automatic hoists. Its application in the area of glass production and processing is of particular interest.

With the method according to the invention, with each lifting process each suspended load that is greater than the empty weight or intrinsic weight (tare weight) of the non-loaded hoist is detected, at the latest after a very brief initial lifting of the vacuum-operated hoist, i.e., temporally immediately after or at the same time as the start of lifting. The detection device is linked to the control of the hoist and the vacuum generating means by signal technology and/or mechanically such that the hoist, in the presence of a load signal, can only lift a suspended load again if it is simultaneously determined that the vacuum is turned on in accordance with specifications and/or is available with a sufficient pressure differential. With otherwise proper technical condition of the hoist and correct placement of the vacuum-operated lifting mechanism on the surface of the load, dropping of the load is thus virtually no longer possible.

Cases in which a vacuum-operated lifting mechanism is placed in the region of a hole or on an uneven surface of the load to be lifted are included in the insufficient vacuum situation. Depending on the size of the hole or the unevenness of the surface, only a "weak" lifting of the load may be possible although the vacuum generating means is properly connected since air can flow freely through the hole or under the incompletely sealed edge of the vacuum-operated lifting mechanism. In order to rule out such cases, the mechanical or electrical load detection may be linked in an improvement of the invention with a verification of the actual pressure differential. The (minimum) pressure differential required in the individual case may be determined by the control means of the hoist depending on the load actually suspended.

Different designs may be implemented for the actual load detection device. With only indirect detection of the suspended load, the detection device does not come into direct contact with the load. It must then be precisely calibrated to the intrinsic weight/tare weight of the hoist so that erroneous detections can be ruled out. However, to avoid malfunctions, a specific response threshold may be provided, below which the safety cutout switch does not respond despite an actual load slightly higher than the tare weight.

Various methods and means are possible for implementation. For example, known deformation measurement devices customary in the trade (balances, strain gauges, etc.) may be incorporated into the force flow of the hoist or provided on its components. Alternatively or additionally, it is also possible to provide load detection on or in the drive of the hoist, for example, detection of the consumed power of an electrical drive or the working pressure of a hydraulic/pneumatic drive, which will be in each case higher along with a lifted load than with the lifting of the tare weight alone.

It is also conceivable to provide direct load detection, e.g., with the aid of mechanical probes or other sensors, which more certainly detect a load located beneath the lifting device as well as the contact between the load and the lifting device. Variants that detect merely the presence of a load and not its weight must, however, be designed such that the raising of the hoist from a load placed at the measurements site or a stacked load is not blocked. The detaching of the vacuum-operated lifting mechanism is usually supported by a brief surge, which may overlay a still present vacuum.

In a first alternative embodiment of the method according to the invention, during response to the load protection device after a very brief initial lifting, the load is lowered again to its storage stack to minimize the risk of dropping the load. In another variant, in addition to interrupting the lifting process, the vacuum is turned on or the pressure differential increased in order to additionally secure the load against dropping. It may also be advantageous, according to a third improvement, to activate a warning signal that makes the operator aware of the absent or insufficient vacuum.

An increase in the effective pressure differential for safety may, for example, be achieved by connecting an additional pump or brief connection of a previously evacuated container on the vacuum system of the hoist.

In principle, once provided, the load detection device may also be used to detect an overload of the hoist by also defining and upper load threshold which may not be exceeded in any case, not even with sufficient vacuum, and likewise results in the automatic refusal to perform a lifting process. Such an overload could possibly be accompanied by its own warning signal that preferably differs clearly from the signal for the absence of a vacuum. On the other hand, a load detection device already provided for other purposes can, after appropriate adaptation of the control means, also be used for the purpose according to the invention.

BRIEF DESCRIPTION OF THE DRAWINGS

Further details and advantages of the object of the invention are evident from the drawings of an exemplary embodiment and its more detailed following description.

They depict in simplified, not-to-scale presentation

DETAILED DESCRIPTION

Figure 1:
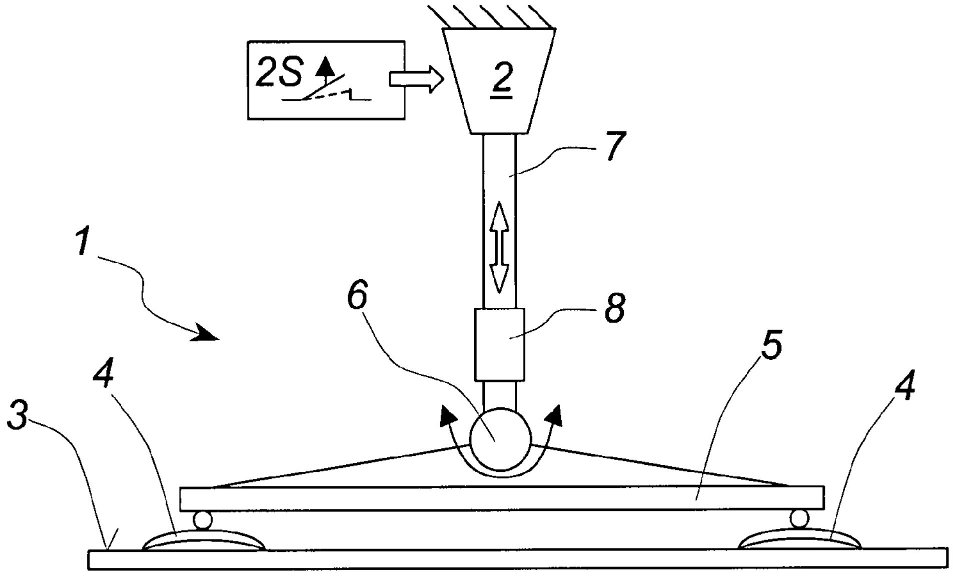
FIG. 1 a vacuum-operated hoist with a picked-up load in the form of a plate in a first position.

According to FIG. 1 a hoist 1 is linked in a manner not depicted in detail to a lifting drive 2. The movability of the hoist 1 up/down in the vertical direction is indicated by a double arrow. The lifting drive 2 itself is moreover movable in a conventional manner, such that a picked-up, plate-shaped load 3 can be both lifted and moved horizontally. It is switched on and off with a control 2S. Usually, the switches (not shown) of the control 2S are actuated manually by an operator.

For the sake of simplicity, the associated electrical and pneumatic line systems as well as this system for vacuum generation are not shown.

The hoist 1 comprises at least one, but usually a plurality of vacuum-operated lifting mechanisms 4 in the form of suction cup lifters with elastically deformable sealing edges that may be placed on a smooth surface of the load 3 and can then be evacuated with the aid of a (not shown) vacuum generating device (Venturi tube, suction pump, or the like).

The vacuum-operated lifting mechanisms 4 are connected via a rigid support frame 5 with a pivoting device 6. A curved double arrow clearly indicates their (ball-jointed) movability. It hangs on a vertical working arm 7 of the hoist.

These vacuum-operated lifting mechanisms 4 are slightly deformed elastically when placed on a load surface (in this case, the surface of the plate 3) such that air enclosed between them and said surface is partially displaced. At the time of a subsequent lifting, the displaced air cannot flow back in such that even without switching on the vacuum generator or evacuating the vacuum-operated lifting mechanism an effective pressure differential is established (suction cup effect or displacement vacuum), which intensifies for the lifting of a not overly heavy load.

A load detection device 8 is depicted here schematically as a box in the working arm 7. This is, however, only one possible variant of its functional arrangement. It may also be disposed nearer the drive 2 or in the support frame 5, or may even be integrated into the pivoting device 6. It may be implemented, for example, as an electromechanical weighing device with springs and contacts that respond as a function of load. Another conceivable embodiment is a force measurement device outfitted with strain gauges that can be implemented as a separate component. Alternatively, the strain gauges or equivalent signal generators could also be installed directly on the working arm 7, on the pivoting device 6 or the support frame 5 of the hoist 1.

The load detection device could, however, also be arranged above the drive 2 between it and the basic support structure of the hoist, whereby, in this case, the drive must also be calculated into the tare weight.

And finally, the load detection device may also be provided in the drive itself or in its control in the form of a device to measure the power consumption (load current).

High robustness of the load detection device 8 for harsh use is important, in particular, resistance to impact and shock. Compensation should also be provided for load situations that deviate from pure tensile loading of the working arm 7, in particular for torque or bending moment.

It is significant in all variants that the load detection device 8 detect the weight of the hoist or, in any case, of the support frame 5 with the vacuum-operated lifting mechanisms 4 precisely independently of its concrete installation position and design, and also every change in this while resulting from a suspended load.

It must thus be calibrated to a tare weight that corresponds to the non-loaded state of the hoist or of the entire portion of the load chain arranged downstream from it in the direction of gravity. If this tare weight is not exceeded in a lifting process, the load detection device 8 does not affect the function of the hoist 1.

Figure 2:
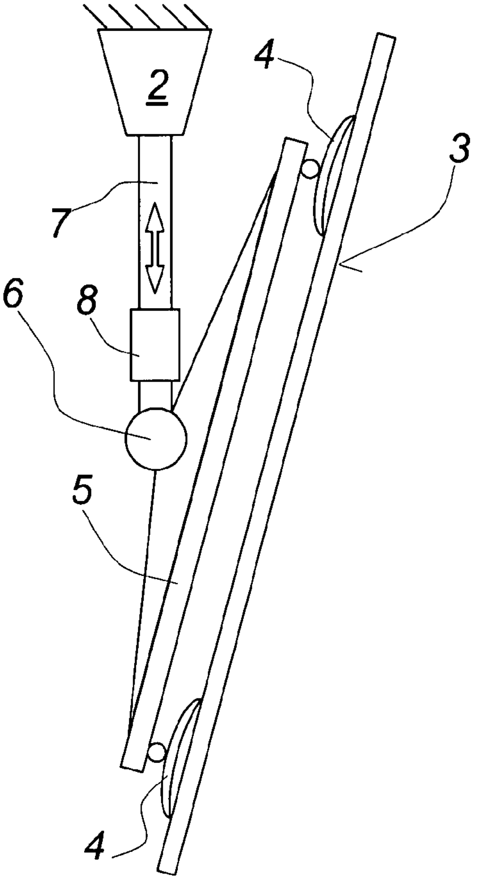
FIG. 2 the vacuum-operated hoist with the plate in a position rotated out of the horizontal.

As a comparison with FIG. 2 reveals, on the one hand, the function of the load detection device 8 should also be protected in the pivoted load position (pivot motion around the axis of the pivoted device 6). In fact, it is possible when removing plates from a stacker in which they rest on one edge to encounter incorrect loading processes of the type mentioned in the introduction without a sufficient pressure differential over the plate or load. The suction cup-vacuum-operated lifting mechanisms are always placed with light pressure on the surface of the load so that their sealing lips come into position snugly thereon.

Secondly, FIG. 2 illustrates the risk potential with insufficient or absent vacuum in the vacuum-operated lifting mechanisms 4—the plate 3 would, at the latest, in such a steep position slide to the floor since the active area of the low pressure differential becomes too little in the vertical component and the friction of the diaphragm lips of the vacuum-operated lifting mechanisms 4 alone can no longer hold it.

Figure 3:
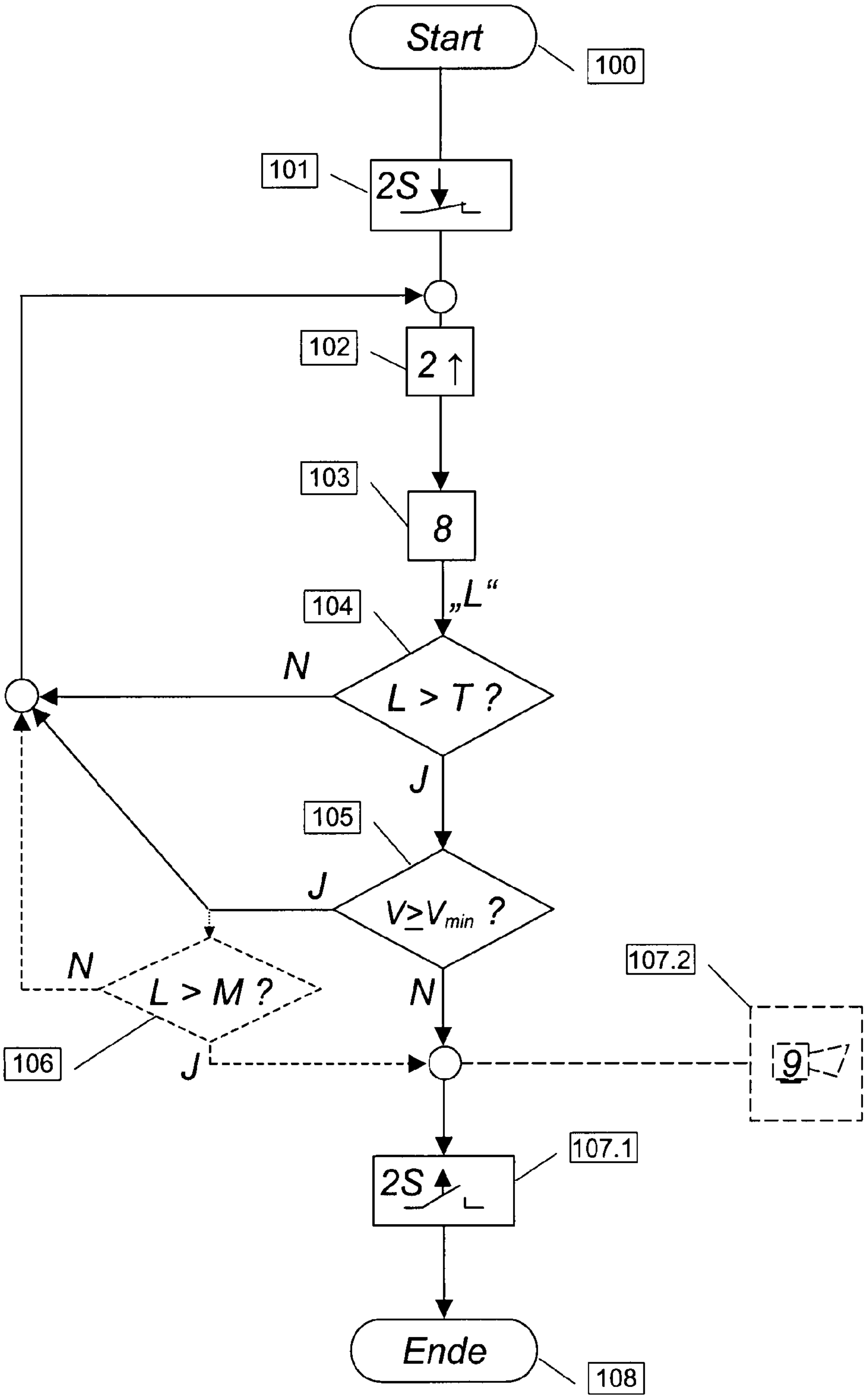
FIG. 3 a functional diagram of the load protection means.

FIG. 3 depicts in a flowchart and a possible design of the function of the load detection device 8 in coordination with the control 2S of the hoist 1 depicted in FIGS. 1 und 2. With Start (Step 100) the hoist drive 2 is switched on in Step 101 with the aid of the control 2S in the lifting direction (upward pointing arrow) and begins a lifting process in Step 102.

At the same time as the following lifting of the support frame 5, the load detection device 8 detects in Step 103 the weight loading the hoist, possibly even itself. It then generates a load detection signal L, that is fed to a comparator stage and evaluated thereby in Step 104. The comparator stage uses the tare weight T that is stored after calibration as a fixed comparison parameter. If L is now not greater than T (branch "N"; no picked-up load detected), there is no reason for intervention, and the lifting drive 2 can continue with the lifting of the support frame 5 (without load).

If L is greater than T ("J"-branch of Step 104), in the next Step 105 the presence of a sufficient vacuum $V_{min}$ on the vacuum-operated lifting mechanism 4 is verified. This can be verified on the one hand with the aid of the switch state of valves and/or using signals from pressure sensors in the line system for the evacuation of the vacuum-operated lifting mechanism; on the other hand, also directly on the vacuum-operated lifting mechanisms themselves with the aid of position or deformation sensors. The latter may be designed, for example, as probes that detect a more or less strong impression on the membrane of each elastic vacuum-operated lifting mechanism 4.

It can be assumed that with the lifting of a load without vacuum applied, this membrane will, in fact, seal and will bring, along with the already mentioned displacement vacuum, a certain lift, that it is, however, not so strongly pressed as in the applied state with resting load and after lifting under the full operational vacuum.

With regard to the case mentioned of the placement of a vacuum-operated lifting mechanism on a hole in the load (plate), detection of the actual vacuum or of the pressure differential is very advantageous. This can be compared by the controller with a minimal vacuum $V_{min}$ determined as a function of load. This forms the comparison value $V_{min}$ in Step 105.

Suitable vacuum detection means are known such that details of their design and mode of operation are omitted here.

If the test using the signals evaluated in Step 105 indicates that a sufficient vacuum is ensured ("J"-branch), the protection device does not have to be used and the cycle jumps back to Step 102.

Alternatively, the cycle can simply end at this point or after Step 104 in the N-branch, since the safety tests described here has to be performed only once in each case at the beginning of each lifting process. The lifting process is continued.

However, if the test in Step 105 indicates that no sufficient vacuum is present ("N"-branch), the resultant protection signal intervenes in Step 107.1 in the control 2S and switches off the lifting drive 2, and thus stops the lifting process. Also, optionally in a Step 107.2 a signal generator 9 (acoustic/horn, optic/warning light, haptic/e.g., a vibrator on the manual control) may be activated. The operator is urgently warned and asked to verify and possibly switch on the vacuum and/or the application of the vacuum lifting mechanism. The cycle ends in Step 108.

As a variant, in Step 107.1 instead of switching off it is also possible for the lifting drive 2 to put down the load 3 just picked up, i.e., to convert the lifting movement just beginning into a discharge movement. Such a putting down of the load would be comparable to the automatic reversing, for example, of electrically driven windows in automobiles when the associated safeties detect in trap mind of an object between the edge of the window and the frame. Since the load protection process is fast and runs in the millimeter or, at most, in the centimeter range, the load is again safely put down where it had been picked up immediately after detection of lifting contrary to specifications. This provides an additional contribution to the improvement of safety.

As an additional function of the load detection device 8 that is only depicted by broken lines, after the J-branch of Step 105 instead of the return to Step 102 or to the end of the test cycle, it is possible in an intermediate Step 106 to perform an overload test regardless of whether a sufficient vacuum is present or not. In this step, the load detected is compared with a predefined and/or admissible maximum load M. if the load detected is not greater than the value M, the cycle is terminated. There is no intervention in the control of the hoist. However, if the load is to be monitored not only in the moment of lifting, but also continuously during the entire lifting and displacement process, a return to Step 102 is recommended, so that loop operation of the system all the way to manual turning off of the hoist is possible.

If the maximum load according to Step 106 is reached or exceeded, just as with absent or insufficient vacuum, with Step 107.1 the just begun (or running) lifting process is interrupted, and a warning signal is triggered in Step 107.2. This signal could advantageously differ from the signal with absent or insufficient vacuum.

As another variant, automatically turning on or, optionally, increasing the vacuum could be controlled, but even here interrupting or reversing the lifting process takes priority. It should not be left to the control alone to judge whether the lifting process can continue with a picked-up load after turning on the vacuum or not; instead, examination by the operator is required. Thus, not only is increased safety obtained, but also a stronger learning effect is sought in the operating personnel.

The flowchart depicted in FIG. 3 can be implemented functionally by means of suitable signal generators and discrete switching elements or even through programming (microchip programming).

Obviously, variants of the cycle depicted here by way of example are possible without departing from the mode of operation according to the invention. It would be, for example, conceivable and expedient to provide monitoring of the actual load in the flowchart in a band between the values T and M ($T<L<M$) and to follow it with the vacuum test only for the case that L is greater than T, but smaller than M.

Then, when the admissible maximum value is exceeded, the lift drive is turned off without prior checking of the vacuum. The entire function of the load protection device is not however altered thereby.

The invention claimed is:

1. A method for operating vacuum-operated hoists comprising:

providing at least one elastically deformable vacuum-operated lifting mechanism, configured to generate a displacement vacuum after placement on a load at the time of lifting of the load;

providing a controllable vacuum generator;

providing at least one motorized lifting drive; and providing a load detection device to detect weight of the load when picked up by the hoist, wherein the load detection device, at the time of each lifting process, after detecting that the load exceeds a predetermined tare weight of the hoist, generates a protection signal if i) the controllable vacuum generator is not turned on or ii) there is an insufficient vacuum, the protection signal performing at least one of:

a) directly or indirectly deactivating the at least one motorized lifting drive by way of a switch-off control; and b) preventing further lifting of the load if, upon detection of the load and lift to be used, no pressure differential or an insufficient pressure differential is present, wherein the load detection device automatically switches on the controllable vacuum generator to protect the load or activates the controllable vacuum generator to generate a higher pressure differential, the method further comprising providing at least one of pressure sensors, valve position sensors, and probes on the vacuum-operated lifting mechanism to generate control signals to verify presence of a minimum vacuum, wherein the minimum vacuum is determined as a function of the load actually detected and serves as a threshold value for generation of the protection signal.

2. The method of claim 1, wherein the load detection device, after terminating incipient lifting due to an insufficient pressure differential, actuates the switch-off control to set down the load.

3. The method according to claim 1, wherein the load detection device generates the protection signal through at least one of a discrete switch and a force sensor.

4. The method of claim 3, wherein the at least one of the discrete switch and the force sensor comprise strain gauges.

5. The method of claim 1, wherein the load detection device is integrated in the motorized lifting drive and the protection signal is generated by detecting capacity of the load detection device.

6. The method of claim 1, wherein the protection signal is generated only when a specific threshold value above the tare weight is exceeded.

7. The method of claim 1, wherein the load detection device generates a further protection signal to perform at least one operation between switching off and reversing the lifting drive when a lifted load exceeds a predefined maximum weight regardless of presence or absence of a vacuum.

8. The method of claim 1, wherein actuation of the switch-off control triggers a warning signal.

9. The method of claim 8, wherein the triggered warning signal is at least one of an acoustic warning signal, an optical warning signal and a haptic warning signal.

10. The method of claim 8, wherein when the maximum weight is exceeded, the warning signal is different from the protection signal.

11. A method for operating vacuum-operated hoists comprising:

providing at least one elastically deformable vacuum-operated lifting mechanism, configured to generate a displacement vacuum after placement on a load at the time of lifting of the load;

providing a controllable vacuum generator;

providing at least one motorized lifting drive; and providing a load detection device to detect weight of the load when picked up by the hoist, wherein the load detection device, at the time of each lifting process, after detecting that the load exceeds a predetermined tare weight of the hoist, generates a protection signal if i) the controllable vacuum generator is not turned on or ii) there is an insufficient vacuum, the protection signal performing at least one of:

a) directly or indirectly deactivating the at least one motorized lifting drive by way of a switch-off control; and b) preventing further lifting of the load if, upon detection of the load and lift to be used, no pressure differential or an insufficient pressure differential is present, and wherein the load detection device automatically switches on the controllable vacuum generator to protect the load or activates the controllable vacuum generator to generate a higher pressure differential and wherein the load detection device generates a further protection signal to perform at least one operation between switching off and reversing the lifting drive when a lifted load exceeds a predefined maximum weight regardless of presence or absence of a vacuum.

12. A method for operating vacuum-operated hoists comprising:

providing at least one elastically deformable vacuum-operated lifting mechanism, configured to generate a displacement vacuum after placement on a load at the time of lifting of the load;

providing a controllable vacuum generator;

providing at least one motorized lifting drive; and providing a load detection device to detect weight of the load when picked up by the hoist, wherein the load detection device, at the time of each lifting process, after detecting that the load exceeds a predetermined tare weight of the hoist, generates a protection signal if i) the controllable vacuum generator is not turned on or ii) there is an insufficient vacuum, the protection signal performing at least one of:

a) directly or indirectly deactivating the at least one motorized lifting drive by way of a switch-off control; and b) preventing further lifting of the load if, upon detection of the load and lift to be used, no pressure differential or an insufficient pressure differential is present, and wherein the load detection device automatically switches on the controllable vacuum generator to protect the load or activates the controllable vacuum generator to generate a higher pressure differential, wherein actuation of the switch-off control triggers a warning signal, and wherein when a maximum weight is exceeded, a warning signal is different from the protection signal.

* * * * *

UNITED STATES PATENT AND TRADEMARK OFFICE

CERTIFICATE OF CORRECTION

PATENT NO. : 8,070,203 B2
APPLICATION NO. : 12/066264
DATED : December 6, 2011
INVENTOR(S) : Franz Schaumberger It is certified that error appears in the above-identified patent and that said Letters Patent is hereby corrected as shown below:

Column 3, line 30, the word “and” should read --an--.

Signed and Sealed this
Tenth Day of April, 2012

David J. Kappos
*Director of the United States Patent and Trademark Office*